United States Patent [19]

Marissen et al.

[11] 4,428,591
[45] Jan. 31, 1984

[54] PLASTIC PIPE PROVIDED WITH A GROOVE

[75] Inventors: Roelof H. Marissen, Bergentheim; Joannes H. Beune, Hardenberg, both of Netherlands

[73] Assignee: Wavin B.V., Netherlands

[21] Appl. No.: 379,001

[22] Filed: May 17, 1982

Related U.S. Application Data

[62] Division of Ser. No. 108,050, Dec. 28, 1979, Pat. No. 4,338,716.

[30] Foreign Application Priority Data

Jan. 9, 1979 [NL] Netherlands .......................... 7900173

[51] Int. Cl.³ .............................................. F16J 15/10
[52] U.S. Cl. ................................ 277/207 A; 138/109; 138/148; 138/115; 285/138; 285/379

[58] Field of Search ............... 138/109, 111, 113, 114, 138/115, 148, 149, 172, 178; 285/138, 379; 277/207 A

[56] References Cited

U.S. PATENT DOCUMENTS 4,341,392 7/1982 Dongeren .......................... 138/155

Primary Examiner—James E. Bryant, III
Attorney, Agent, or Firm—Wigman & Cohen

[57] ABSTRACT

A plastic pipe comprises an inner wall and an outer wall, being integral with longitudinal partitions between them and bounding longitudinally extending channels and a circumferential, helically or non-helically extending groove, which groove has been formed by closing the channels by pressing channel wall parts onto each other. A retaining ring may be snapped into an external groove.

3 Claims, 6 Drawing Figures

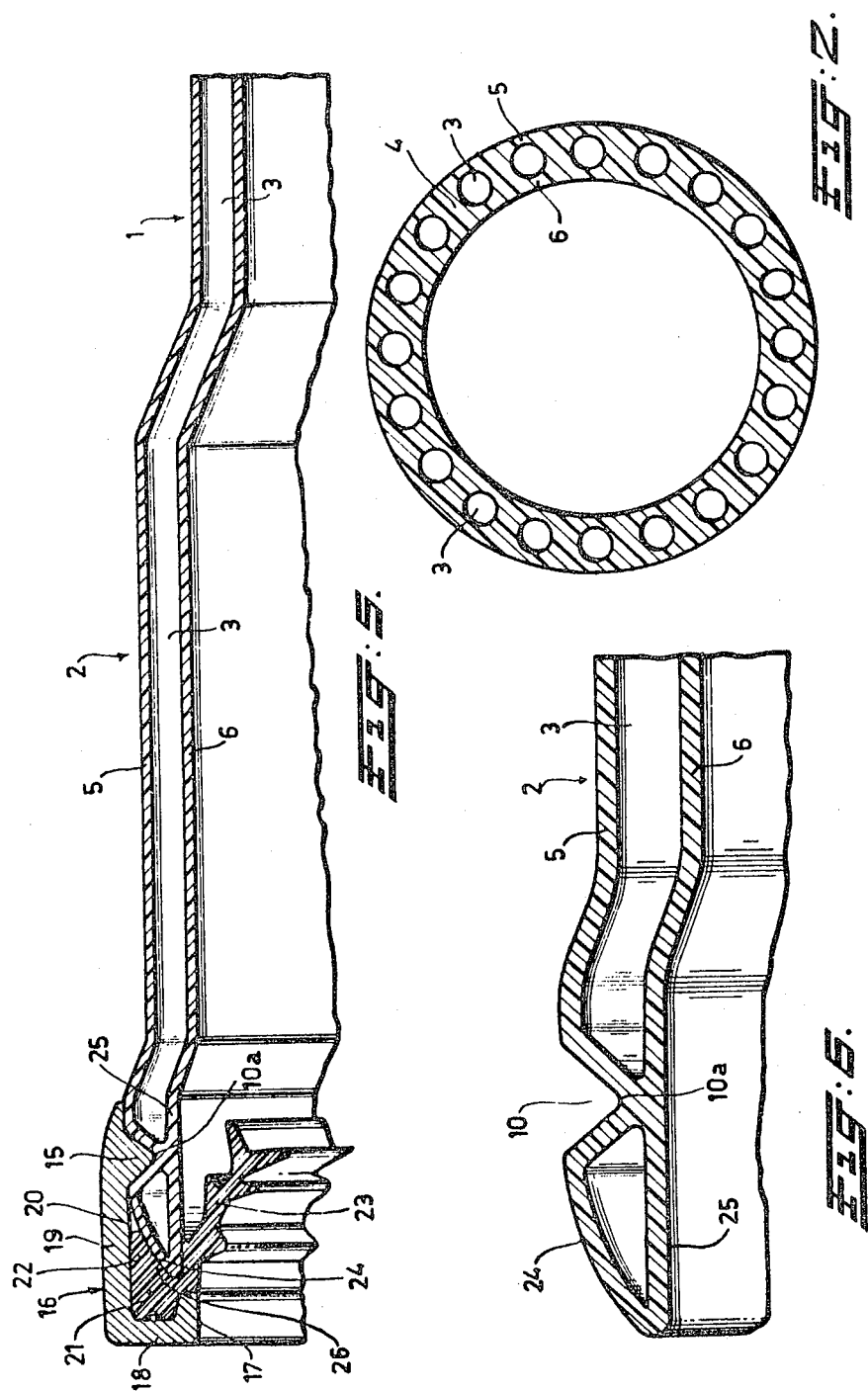

PLASTIC PIPE PROVIDED WITH A GROOVE

This is a division of application Ser. No. 108,050 filed Dec. 28, 1979 now U.S. Pat. No. 4,338,716.

BACKGROUND OF THE INVENTION

The present invention concerns a plastic pipe provided with a groove.

Plastic pipes comprising an internal or external groove are known per se. Due to the formation of the groove in the plastic pipes, the outer diameter or the inner diameter of the respective pipe will be changed. In case of the unchanged outer or inner diameters of plastic pipes, groove formation will cause pipe walls to become extremely thin, causing the strength properties of said pipes to be considerably reduced.

Forming a circumferential elevation upon the outside or upon the inside of the plastic pipe at the location of the groove is also very disadvantageous. This occurs when (for instance) a socket is provided with a groove, which then serves for holding a retaining ring, which together with the front end of the respective pipe, constitutes an end groove chamber for the receipt of part of a sealing member. A circumferential elevation disposed inside the respective pipe parts, upon the inner wall of one pipe part, will then easily give rise to sealing problems.

SUMMARY OF THE INVENTION

The present invention aims to provide a plastic pipe with a groove, wherein after forming a groove, the inner wall or outer wall of a pipe part is provided with a circumferential elevation having a height less than known circumferential elevations or which pipe part is not provided with a circumferential elevation at all.

According to the invention, the plastic pipe comprises an inner wall and an outer wall having longitudinal partitions in between them and being integral with said inner wall and said outer wall, and longitudinally extending channels therethrough. The groove is formed by pressing the channel walls toward each other at least at a short distance from the pipe end.

In this manner, especially in pipes with similar channels, socket parts with groove chambers are obtained, not causing any particular reduction in the properties of strength of the respective material at the location of the groove.

The groove is formed by pressing the channel walls tightly toward each other and closing the channels starting from the inner wall of the pipe, while forming an internal groove chamber for the receipt of a sealing member.

In a preferred embodiment the groove is formed by pressing the channel walls into each other and closing the channels, thus forming a widened portion in which a groove is obtained for holding a retaining ring. The formation of an end groove at the front end of the respective pipe serves for the receipt of a sealing member part.

Forming a groove by pressing the channel walls tightly toward each other and closing the channels further offers the great advantage that liquid will hardly be able to come into contact with the sealing member, so that a very reliable seal is obtained.

A particularly advantageous embodiment of a plastic pipe in accordance with the invention comprises a widened portion with an internal helically extending groove, obtained by pressing the channels walls tightly toward each other, starting from the inside of the widened portion and then forming the helically extending groove, so that a first plastic pipe part of that type just described can be tightly screwed into a second plastic pipe part which is provided with an external helically extending groove likewise formed by pressing the channel walls tightly toward each other.

SURVEY OF THE DRAWINGS

FIG. 2 shows a cross section of a plastic pipe in accordance with the invention;

FIG. 5 shows a further embodiment of a plastic pipe in accordance with the invention comprising an external groove and a retaining ring for the formation of an end groove chamber, and FIG. 6 shows a detailed view of the end of a plastic pipe according to the present invention.

DESCRIPTION OF PREFERRED EMBODIMENTS

Figure 1:
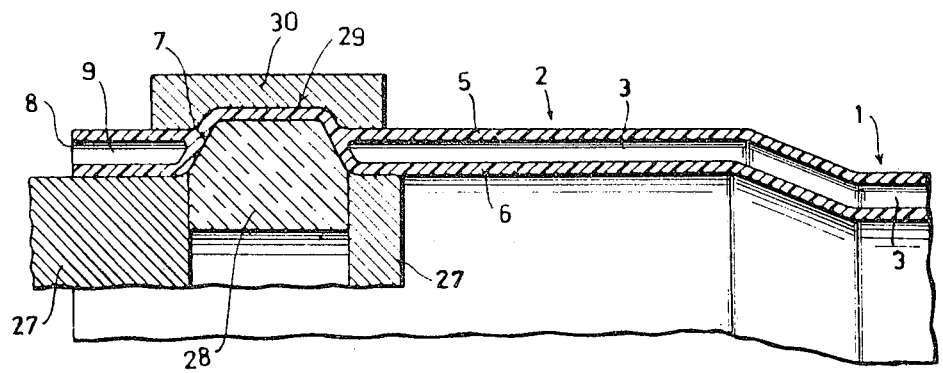
FIG. 1 shows a first embodiment of a plastic pipe according to the invention.

FIG. 1 shows a plastic pipe part 1 comprising a socket part 2, said pipe part 1 and said socket part 2 comprising longitudinally extending channels 3, bound by longitudinally extending partitions 4 shown in FIG. 2. The socket 2 is provided with an outer wall 5 and an inner wall 6. By pressing the inner wall 6 outwardly toward the outer wall 5, a groove chamber 7 is obtained for the receipt of a sealing member.

It will be obvious that a pipe of this type will have an outside elevation, the height of which is less than that which is obtained when such a groove is formed in a pipe not comprising longitudinally extending channels.

As the groove chamber 7 is located at a short distance from the front end 8 of the plastic pipe, open channel parts 9 will exist between the front end 8 of the plastic pipe and the groove chamber 7.

FIG. 2 clearly shows the longitudinally extending channels 3 formed by the longitudinal partitions 4. Said longitudinally extending channels 3 preferably have a rounded or an elliptical cross-section, and more preferably a round cross-section.

Figure 3:
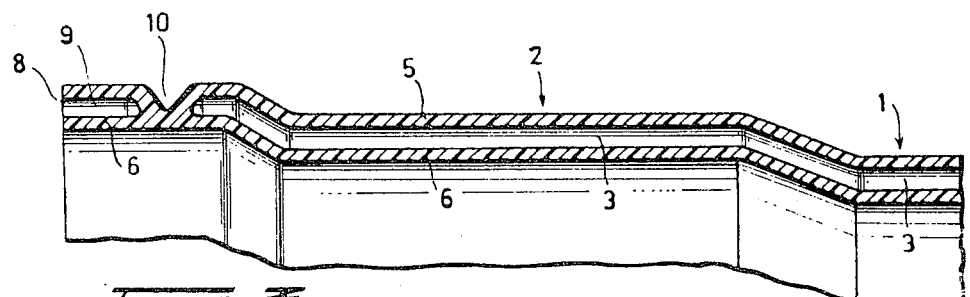
FIG. 3 shows a further embodiment of a plastic pipe part in accordance with the invention comprising an external groove.

FIG. 3 shows a further embodiment likewise comprising a pipe part 1 being provided with a socket part 2 and longitudinal channels 3, extending within said socket part 2. In view of the latter an external groove 10 is formed by pressing the outer wall 5 of the socket 2 toward the inner wall 6, thus sealing off the channels 3.

The embodiment as described hereinbefore likewise shows open channel parts 9 between the external groove 10 and the front end 8 of the plastic pipe part 1.

Figure 4:
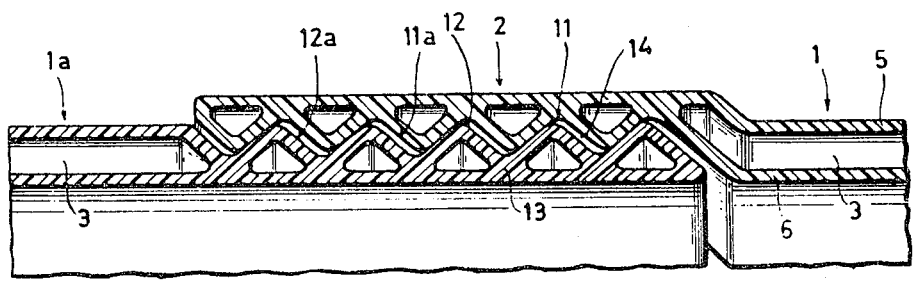
FIG. 4 shows an embodiment of a connection between two plastic pipe parts in accordance with the invention, one pipe part being provided with a helically extending external groove, the other pipe part being provided with a helically extending internal groove, so as to obtain a screw connection.

FIG. 4 shows a screw-connection between two plastic pipe parts 1 and 1a comprising longitudinally extending channels 3. One plastic pipe part 1 is provided with a widened socket part 2, the inside of which comprises a helically extending internal groove 11, which seals off the channels 3 at a plurality of locations.

FIG. 4 also shows a second pipe part 1a, the outer wall 5 of the socket 13 being provided with a helically extending external groove 12. By selecting the same pitch of the grooves 11 and 12, a first plastic pipe part 1 can be connected with a second plastic pipe part 1a, by screwing their ends 2 and 13 tightly against each other.

The screwing operation is facilitated by providing a small clearance 14 between the wall 11a of the helically extending internal groove 11 and the wall 12a of the helically extending external groove 12.

FIG. 5 shows a further embodiment wherein an external groove 10a serves for receiving a projecting part 15 of a retaining ring 16, said retaining ring 16 comprising a short leg part 17, a bottom part 18 and a long leg part 19. As seen in a longitudinal direction, said retaining ring 16 therefore has a J-shaped cross-section.

The annular projecting part 15 snaps into an external groove 10a, which is formed by pressing the channels 3 together, thus uniting the outer wall 5 with the inner wall 6 of the plastic pipe part 1a.

Not only is a good connection ensured by cooperation of the annular projecting part 15 upon the long leg 19 of the retaining ring 16, with the external groove 10a on the outer wall 5 of the socket 2, but also an annular end groove chamber 20 is produced.

In the annular end groove chamber 20 a head part 21 is arranged with a sealing member 22 which includes a sealing sleeve 23. In a completed pipe connection, the sealing sleeve 23 is received in a longitudinal chamber 25 formed at the front end of the socket 2.

The inner diameter of short leg part 17 is substantially equal to the inner diameter of the inner wall 6 of socket 2 which is provided with the widened longitudinal chamber 25.

Mounting of the retaining ring 16 is facilitated by sealing off the front end of the longitudinally extending channels 3 by a curved end sealing part 24.

The presence of the curved end sealing part 24 ensures an optimum sealing, especially in the case where a sealing part 26 of head 21 of the sealing member 22 adjoins the outer wall of the curved end sealing part 24, thus sealing off the ends of the channels, 3. The curved end sealing part 24 also functions as a chamfer 23. The groove 10 in FIG. 6 is provided with a rounded bottom 10a, in order to prevent a notch action in the plastic material.

FIG. 1 also shows the formation of the groove chamber 7 in the socket 2. To that end the outer wall 5 of the socket 2 is surrounded by an outer mould 30, while the inner wall 5 of the socket 2 is provided with a mandrel 27, comprising an expandable core 28. The expandable core 28 is pressed outwardly, thereby forming the groove chamber 7. The inner wall 6 is pressed entirely outwardly against the outer wall 5 of the socket 2, while sealing off the channels 3. Because the plastic material is able to yield, a very homogeneous wall part 29 of the groove chamber 7 is obtained. Actually the plastic material is pressed away into the channels 3, so that no accumulation of material beside the groove chamber 7 will occur.

What is claimed is:

1. A plastic pipe comprising an inner wall and an outer wall, having longitudinal partitions in between them and being integral with said inner wall and said outer wall, bounding longitudinally extending channels and a helically extending internal groove, made by pressing channel walls onto each other at least at a distance from the pipe end and maintaining the channels beside the internal groove.

2. The plastic pipe according to claim 1, in which the cross-section of the longitudinally extending channels is a rounded shape.

3. A plastic pipe connection including a first plastic pipe according to claim 1 comprising:
   a second penetrating plastic pipe connected to the first plastic pipe, said second plastic pipe having an inner wall and an outer wall with longitudinal partitions in between them and being integral with said inner wall and said outer wall, bounding longitudinally extending channels, and a groove being complimentary to the helically extending groove in the first plastic pipe.

* * * * *